United States Patent
Truemper et al.

(10) Patent No.: US 10,343,781 B2
(45) Date of Patent: Jul. 9, 2019

(54) AIRCRAFT COOLING SYSTEM

(71) Applicant: Airbus Operations GmbH, Hamburg (DE)

(72) Inventors: Torsten Truemper, Hamburg (DE); Matthias Reiss, Hamburg (DE)

(73) Assignee: AIRBUS OPERATIONS GMB, Hamburg (DE)

( * ) Notice: Subject to any disclaimer, the term of this patent is extended or adjusted under 35 U.S.C. 154(b) by 827 days.

(21) Appl. No.: 14/243,073

(22) Filed: Apr. 2, 2014

(65) Prior Publication Data
US 2014/0299309 A1  Oct. 9, 2014

(30) Foreign Application Priority Data

Apr. 3, 2013 (DE) .................. 10 2013 005 595
Apr. 3, 2013 (DE) .................. 10 2013 005 596
Jun. 14, 2013 (DE) .................. 10 2013 211 177

(51) Int. Cl.
*B64D 13/08* (2006.01)
*F25B 21/04* (2006.01)
*B64D 13/06* (2006.01)

(52) U.S. Cl.
CPC ............ *B64D 13/08* (2013.01); *B64D 13/06* (2013.01); *F25B 21/04* (2013.01); *B64D 2013/0629* (2013.01); *Y02B 30/52* (2013.01); *Y02T 50/56* (2013.01)

(58) Field of Classification Search
CPC ......... F25B 21/04; Y02T 50/56; Y02B 30/52; B64D 13/08; B64D 13/06; B64D 2013/0629
See application file for complete search history.

(56) References Cited

U.S. PATENT DOCUMENTS

| | | | |
|---|---|---|---|
| 5,361,587 A | 11/1994 | Hoffman | |
| 5,507,150 A | 4/1996 | Weber et al. | |
| 5,513,500 A * | 5/1996 | Fischer | B64D 11/0007 62/239 |
| 6,205,803 B1 | 3/2001 | Scaringe | |
| 6,351,950 B1 | 3/2002 | Duncan | |
| 7,752,852 B2 | 7/2010 | Akei et al. | |
| 7,802,732 B2 | 9/2010 | Scherer et al. | |

(Continued)

FOREIGN PATENT DOCUMENTS

| | | |
|---|---|---|
| CN | 1902089 | 1/2007 |
| CN | 102179140 | 9/2011 |

(Continued)

OTHER PUBLICATIONS

German Search Report, dated Apr. 3, 2013 (102013005595.4).

(Continued)

*Primary Examiner* — Jon T. Schermerhorn, Jr.
(74) *Attorney, Agent, or Firm* — Greer, Burns & Crain, Ltd.

(57) ABSTRACT

An aircraft cooling system including a cooler which is adapted to supply cooling energy to an aircraft device to be cooled, and a heat transfer arrangement which is adapted to transfer waste heat generated by the cooler to a cabin air extraction system. The heat transfer arrangement comprises a heat transfer circuit, in which a liquid heat transfer medium heated by the waste heat of the cooler circulates.

10 Claims, 1 Drawing Sheet

(56) References Cited

U.S. PATENT DOCUMENTS

| | | |
|---|---|---|
| 8,037,698 B2 | 10/2011 | Heckt et al. |
| 8,720,217 B2* | 5/2014 | Reed .................. B64D 11/02 62/244 |
| 2004/0195447 A1* | 10/2004 | Claeys .................. B64D 13/06 244/118.5 |
| 2007/0144729 A1 | 6/2007 | Beier et al. |
| 2008/0087039 A1 | 4/2008 | Reed et al. |
| 2009/0000329 A1 | 1/2009 | Colberg et al. |
| 2009/0211273 A1 | 8/2009 | Klewer |
| 2009/0266084 A1 | 10/2009 | Radhakrishnan et al. |
| 2010/0122540 A1 | 5/2010 | Taras et al. |
| 2011/0005244 A1 | 1/2011 | Finney et al. |
| 2012/0322354 A1 | 12/2012 | Andres |
| 2013/0047630 A1 | 2/2013 | Lu |

FOREIGN PATENT DOCUMENTS

| | | |
|---|---|---|
| DE | 4340317 | 6/1995 |
| DE | 10361709 | 8/2005 |
| DE | 102006005035 | 9/2007 |
| DE | 102007035110 A1 | 1/2009 |
| DE | 102012006628 | 10/2013 |
| EP | 0666214 A1 | 8/1995 |
| EP | 1701884 | 9/2006 |
| EP | 1801009 | 6/2007 |
| EP | 1979233 | 10/2008 |
| EP | 1979233 B1 | 10/2008 |
| EP | 2272757 | 1/2011 |
| JP | 2000329414 A | 11/2000 |
| WO | 2005030579 | 4/2005 |
| WO | 2008014912 A1 | 2/2008 |
| WO | 2009006918 A1 | 1/2009 |
| WO | 2012095646 | 7/2012 |

OTHER PUBLICATIONS

German Search Report, dated Apr. 3, 2013 (102013005596.2).
Chinese Office Action, dated Sep. 8, 2015.
European Search Report for corresponding European Patent Application No. 14163014.5.
European Search Report for corresponding European Patent Application No. 14163012.9.
German Search Report for corresponding German Patent Application No. 102013211177.0.

* cited by examiner

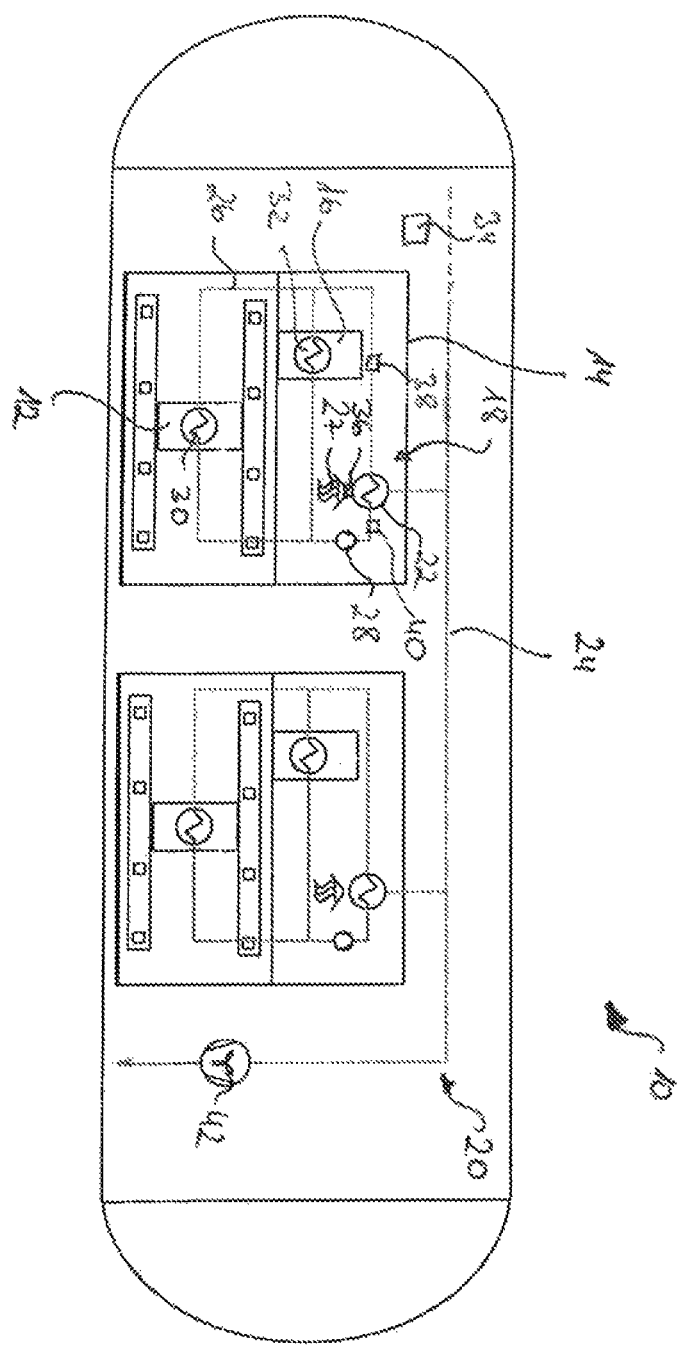

AIRCRAFT COOLING SYSTEM

CROSS-REFERENCES TO RELATED APPLICATIONS

This application claims the benefit of the German patent application No. 102013005596.2 filed on Apr. 3, 2013, the German patent application No. 102013005595.4 filed on Apr. 3, 2013, and the German patent application No. 102013211177.0 filed on Jun. 14, 2013, the entire disclosures of which are incorporated herein by way of reference.

BACKGROUND OF THE INVENTION

The invention relates to an aircraft cooling system and to a method for operating an aircraft cooling system.

In modern commercial aircraft, normally at least one device to be cooled is provided in the area of a galley. The device to be cooled may be, for example, a trolley or a galley area which serves, for example, for storing food intended for distributing to the aircraft passengers. A galley device to be cooled can be supplied with cooling energy by means of a decentralized cooler assigned to the galley. The decentralized cooler may be, for example, configured in the form of an air chiller and be designed for operating with a two-phase coolant, i.e. a coolant which is converted from the liquid to the gaseous state when delivering cooling energy to the device to be cooled. The coolant of the air chiller delivers its cooling energy to an air flow which is blown into the galley device to be cooled after flowing through the air chiller.

Alternatively to this, the decentralized cooler may be configured in the form of an electrically operated refrigerator which generates cooling energy by means of an integrated refrigeration circuit and delivers it to the galley device to be cooled. Both a decentralized cooler configured in the form of an air chiller and a decentralized cooler configured in the form of a refrigerator generate waste heat in operation. This waste heat is released into the surroundings of the cooler, i.e. conducted into the aircraft cabin and must finally be removed from the aircraft cabin by means of the aircraft air conditioning system.

Furthermore, it is known, for example from DE 43 40 317 C2 and U.S. Pat. No. 5,513,500 or from EP 1 979 233 A1 and US 2009/000329 A1, to cool galley devices, such as, for example, trolleys or galley compartments filled with food by cooling stations which are arranged in the galley areas and supplied with cooling energy from a central cold-generating device. The cooling stations are connected via a cooling circuit to the decentralized cold-generating device, in which a liquid or a two-phase cold transfer medium circulates. The waste heat of a cooling system equipped with cooling stations and a central cold-generating device is normally delivered via a heat exchanger to ram air flowing through a ram air duct of the aircraft.

SUMMARY OF THE INVENTION

The object on which the invention is based is to provide an aircraft cooling system and a method for operating an aircraft cooling system which enable an energy-efficient cooling of a device to be supplied with cooling energy on board an aircraft.

An aircraft cooling system according to the invention comprises a cooler which is adapted or configured to supply cooling energy to an aircraft device to be cooled. The cooler may be an air chiller or an electrically operated refrigerator which, for example, supplies cooling energy to a galley device to be cooled. The galley device to be cooled may be, for example, a compartment of the galley which serves for storing food intended for distributing to the aircraft passengers. In particular when the cooler is configured in the form of an air chiller, the cooler may be designed for operating with a two-phase coolant, i.e. a coolant which is converted from the liquid to the gaseous state when delivering cooling energy to the device to be cooled. Alternatively to this, the cooler may be equipped with Peltier elements for cooling energy generation.

The cooler generates waste heat in operation. When the cooler is operated with a two-phase coolant, the two-phase coolant, which is in the gaseous state after delivering cooling energy to the device to be cooled, must be converted back to the liquid state again by heat energy transfer to an appropriate medium. The aircraft cooling system therefore comprises a heat transfer arrangement which is adapted or configured to transfer waste heat generated by the cooler to a cabin air extraction system. The cabin air extraction system normally serves to remove bad odours from the aircraft cabin into the aircraft surroundings. Furthermore, by removing cabin exhaust air from the aircraft cabin by means of a conventional cabin air extraction system, waste heat delivered into the aircraft cabin by heat-generating components arranged in the aircraft cabin is necessarily also removed from the aircraft cabin.

In contrast to this, the aircraft cooling system according to the invention is distinguished in that the heat transfer arrangement comprises a heat transfer circuit, in which a liquid heat transfer medium heated by the waste heat of the cooler circulates. In the cooling system according to the invention, the waste heat of the cooler is thus transmitted, for example by means of a heat exchanger assigned to the cooler, to the liquid heat transfer medium circulating in the heat transfer circuit, which medium for its part delivers its heat energy to the cabin air extraction system. The heat transfer arrangement consequently produces, via the heat transfer circuit or the liquid heat transfer medium circulating in the heat transfer circuit, a very effective thermal coupling between the waste heat-generating cooler and the cabin air extraction system.

The aircraft cooling system according to the invention enables an energy-efficient removal of the waste heat of the cooler from the aircraft cabin. As a result, it is no longer necessary to remove the waste heat generated by the cooler to the aircraft surroundings with the aid of the aircraft air conditioning system or an additional cooling system, so that the aircraft air conditioning system can be relieved or the ram air requirement of the additional cooling system reduced. This enables, in the operation of an aircraft equipped with the aircraft cooling system according to the invention, fuel savings to be achieved.

The heat transfer arrangement of the aircraft cooling system may further be adapted or configured to transfer waste heat generated by a heat-generating aircraft device to the cabin air extraction system. The heat-generating aircraft device may be a galley device, for example an oven, an apparatus for preparing hot drinks or any other galley device which generates waste heat in operation. All that is essential is that also the waste heat of this device does not have to be removed to the aircraft surroundings in an energy-intensive manner with the aid of the aircraft air conditioning system or an additional cooling system, but can be transferred to the cabin air extraction system by means of the heat transfer arrangement of the aircraft cooling system.

Preferably, the heat-generating aircraft device is assigned a heat exchanger which serves to transfer the waste heat of the heat-generating aircraft device to the liquid heat transfer medium circulating in the heat transfer circuit, which medium for its part delivers its heat energy to the cabin air extraction system. The heat exchanger assigned to the cooler and the heat exchanger assigned to the heat-generating aircraft device can be arranged parallel to one another in the heat transfer circuit through which a liquid heat transfer medium flows. In the heat transfer circuit there can further be arranged a conveying device, for example embodied in the form of a pump, which conveys the heat transfer medium, heated by the waste heat of the cooler and/or the waste heat of the heat-generating aircraft device, through the heat transfer circuit. Alternatively to this, provision may also be made for a natural circulation for conveying the heat transfer medium, heated by the waste heat of the cooler and/or the waste heat of the heat-generating aircraft device, through the heat transfer circuit.

In a preferred embodiment of the aircraft cooling system, the heat transfer arrangement comprises a heat exchanger which is adapted or configured to bring the heat transfer medium heated by the waste heat of the cooler and/or the waste heat of the heat-generating aircraft device into thermal contact with cabin exhaust air flowing through a cabin exhaust air line of the cabin air extraction system. The heat exchanger of the heat transfer arrangement is consequently preferably configured in the form of a liquid/air heat exchanger which enables a particularly efficient heat energy transfer from the liquid heat transfer medium flowing through the heat transfer circuit to the cabin exhaust air flowing through the cabin exhaust air line of the cabin air extraction system.

Preferably, the heat exchanger of the heat transfer arrangement is arranged downstream of an extractor in the cabin exhaust air line of the cabin air extraction system. The extractor, which may contain one more filters, is consequently arranged, in the flow direction of the cabin exhaust air through the cabin exhaust air line, upstream of the heat exchanger of the heat transfer arrangement in the cabin exhaust air line and serves, in particular, to remove bad odors from the aircraft cabin. Through the arrangement of the heat exchanger of the heat transfer arrangement downstream of the extractor, the functioning of the extractor is not impaired by the heat exchanger of the heat transfer arrangement.

The aircraft cooling system may further comprise a control unit which is adapted or configured to control a cabin exhaust air volume flow through the cabin exhaust air line of the cabin air extraction system, as a function of the temperature of the cabin exhaust air flowing through the cabin exhaust air line and as a function of the operating state of the cooler and/or of the heat-generating aircraft device, in such a manner that a desired waste heat removal from the cooler and the heat-generating aircraft device is ensured. The control unit may be, for example, embodied in the form of an electronic control unit and be integrated in a central control device of the cabin air extraction system. Alternatively to this, it is, however, also conceivable to form the control unit as a separate control unit. The temperature of the cabin exhaust air flowing through the cabin exhaust air line may be measured, for example, by means of a temperature sensor arranged in the cabin exhaust air line.

Furthermore, operating parameters characteristic of the capacity utilization state of the cooler and/or of the heat-generating aircraft device are transmitted to the control unit, which parameters allow conclusions to be drawn about the waste heat amount generated by the cooler and/or the heat-generating aircraft device in the corresponding capacity utilization state. As an alternative to or in addition to this, the temperature of the heat transfer medium flowing through the heat transfer circuit of the heat transfer arrangement upstream of the heat exchanger of the heat transfer arrangement can also be measured and evaluated by the control unit as a parameter which is characteristic of the waste heat amount generated by the cooler and/or the heat-generating aircraft device as a function of the operating state. The temperature of the heat transfer medium flowing through the heat transfer circuit of the heat transfer arrangement may be measured, for example, by means of a temperature sensor which may be arranged upstream of the heat exchanger of the heat transfer arrangement in the heat transfer circuit.

If the temperature of the cabin exhaust air flowing through the cabin exhaust air line is high, for example when the aircraft is on the ground on hot days, the control unit can ensure, by increasing the cabin exhaust air volume flow through the cabin exhaust air line of the cabin air extraction system, that a proper waste heat removal from the cooler and the heat-generating aircraft device is ensured. Furthermore, the control unit can react to an increasing waste heat amount generated by the cooler and/or the heat-generating aircraft device by increasing the cabin exhaust air volume flow through the cabin exhaust air line of the cabin air extraction system.

Conversely, the control unit can reduce the cabin exhaust air volume flow through the cabin exhaust air line of the cabin air extraction system when the cabin exhaust air flowing through the cabin exhaust air line has a low temperature and thus constitutes a particularly efficient heat sink for the waste heat to be removed from the cooler and/or the heat-generating aircraft device. Likewise, the cabin exhaust air volume flow through the cabin exhaust air line of the cabin air extraction system is reduced under the control of the control unit when the waste heat amount generated by the cooler and/or the heat-generating aircraft device falls, for example, in the case of low capacity utilization of the cooler and/or of the heat-generating aircraft device.

In particular, the control unit may be adapted or configured to control the cabin exhaust air volume flow through the cabin exhaust air line of the cabin air extraction system, as a function of the temperature of the cabin exhaust air flowing through the cabin exhaust air line and as a function of the operating state of the cooler and/or of the heat-generating aircraft device, in such a manner that the temperature of the heat transfer medium flowing through the heat transfer circuit of the heat transfer arrangement downstream of the heat exchanger of the heat transfer arrangement corresponds to a predetermined desired temperature. If the temperature of the heat transfer medium flowing through the heat transfer circuit of the heat transfer arrangement downstream of the heat exchanger of the heat transfer arrangement corresponds to the predetermined desired temperature, a desired waste heat removal from the cooler and/or the heat-generating aircraft device is ensured, i.e. it is ensured that the waste heat generated by the cooler and/or the heat-generating aircraft device is properly transferred from the heat transfer arrangement to the cabin air extraction system.

In a preferred embodiment of the aircraft cooling system, the control unit is adapted or configured to control the cabin exhaust air volume flow through the cabin exhaust air line of the cabin air extraction system by appropriate control of a conveying device for conveying cabin exhaust air through the cabin exhaust air line. The conveying device for conveying the cabin exhaust air through the cabin exhaust air line may be, for example, configured in the form of a fan arranged in the cabin exhaust air line.

In a method according to the invention for operating an aircraft cooling system, cooling energy is supplied, to an aircraft device to be cooled, by means of a cooler. Waste heat generated by the cooler is transferred to a cabin air extraction system by means of a heat transfer arrangement. The heat transfer arrangement comprises a heat transfer circuit, in which a liquid heat transfer medium heated by the waste heat of the cooler circulates.

The heat transfer arrangement may further transfer waste heat generated by a heat-generating aircraft device to the cabin air extraction system.

The heat transfer medium heated by the waste heat of the cooler and/or the waste heat of the heat-generating aircraft device may be brought into thermal contact with cabin exhaust air flowing through a cabin exhaust air line of the cabin air extraction system by means of a heat exchanger of the heat transfer arrangement.

A cabin exhaust air volume flow through the cabin exhaust air line of the cabin air extraction system is preferably controlled by means of a control unit, as a function of the temperature of the cabin exhaust air flowing through the cabin exhaust air line and as a function of the operating state of the cooler and/or of the heat-generating aircraft device, in such a manner that a desired waste heat removal from the cooler and/or the heat-generating aircraft device is ensured.

The cabin exhaust air volume flow through the cabin exhaust air line of the cabin air extraction system may be controlled by means of the control unit, as a function of the temperature of the cabin exhaust air flowing through the cabin exhaust air line and as a function of the operating state of the cooler and/or of the heat-generating aircraft device, in such a manner that the temperature of the heat transfer medium flowing through the heat transfer circuit of the heat transfer arrangement downstream of the heat exchanger of the heat transfer arrangement corresponds to a predetermined desired temperature.

The control unit may control the cabin exhaust air volume flow through the cabin exhaust air line of the cabin air extraction system by appropriate control of a conveying device for conveying cabin exhaust air through the cabin exhaust air line.

BRIEF DESCRIPTION OF THE DRAWINGS

A preferred embodiment of the invention will now be explained in more detail with reference to the appended schematic drawing, in which The FIGURE shows a schematic illustration of an aircraft cooling system.

DETAILED DESCRIPTION OF THE PREFERRED EMBODIMENTS

An aircraft cooling system 10 illustrated in the FIGURE comprises a cooler 12 configured in the form of an air chiller, which serves to supply cooling energy to areas of a galley 14 to be cooled. The galley areas to be cooled may be, for example, galley compartments which serve to store food intended for distribution to the aircraft passengers. In operation, the cooler 12 generates waste heat. Moreover, a heat-generating aircraft device 16 is present in the galley 14. The heat-generating aircraft device 16 may be, for example, an oven, an apparatus for preparing hot drinks or any other device which generates waste heat in operation.

The aircraft cooling system 10 further comprises a heat transfer arrangement 18 which serves to transfer the waste heat generated by the cooler 12 and the waste heat generated by the heat-generating aircraft device 16 to a cabin air extraction system 20. The heat transfer arrangement 18 comprises a heat exchanger 22, through which flows on its cold side cabin exhaust air conducted through a cabin exhaust air line 24 of the cabin air extraction system 20. On its hot side, by contrast, a liquid heat transfer medium can flow through the heat exchanger 22, which circulates in a heat transfer circuit 26 which serves to remove waste heat from the cooler 12 and the heat-generating aircraft device 16. The heat exchanger 22 of the heat transfer arrangement 18 is arranged downstream of an extractor 27 in the cabin exhaust air line 24 of the cabin air extraction system 20.

The cooler 12 and the heat-generating aircraft device 16 are arranged parallel to one another in the heat transfer circuit 26. A conveying device 28, which is configured in the form of a pump and is arranged in the heat transfer circuit 26, serves to convey the heat transfer medium through the heat transfer circuit 26. Alternatively to this, provision may also be made for a natural circulation for conveying the heat transfer medium through the heat transfer circuit 26. The transfer of the waste heat from the cooler 12 and the heat-generating aircraft device 16 to the heat transfer medium circulating through the heat transfer circuit 26 is effected in each case via heat exchangers 30, 32 assigned to the cooler 12 and the heat-generating aircraft device 16, respectively. A conveying device 42 configured in the form of a fan serves to convey the cabin exhaust air, to be removed from the aircraft cabin, through the cabin exhaust air line 24 of the cabin air extraction system 20.

Finally, the aircraft cooling system 10 comprises a control unit 34 configured in the form of an electronic control unit. The control unit 34 controls a cabin exhaust air volume flow through the cabin exhaust air line 24 of the cabin air extraction system 20, as a function of the temperature of the cabin exhaust air flowing through the cabin exhaust air line 24 and as a function of the operating state of the cooler 12 as well as of the heat-generating aircraft device 16, in such a manner that the temperature of the heat transfer medium flowing through the heat transfer circuit 26 of the heat transfer arrangement 18 downstream of the heat exchanger 22 of the heat transfer arrangement 18 corresponds to a predetermined desired temperature, and consequently a proper waste heat removal from the cooler 12 and the heat-generating aircraft device 16 is ensured. The temperature of the cabin exhaust air flowing through the cabin exhaust air line 24 is measured by means of a temperature sensor 36 arranged in the cabin exhaust air line 24. A temperature sensor 38 arranged downstream of the heat exchanger 22 in the heat transfer circuit 26 serves to detect the temperature of the heat transfer medium flowing through the heat transfer circuit 26 downstream of the heat exchanger 22.

Furthermore, operating parameters characteristic of the capacity utilization state of the cooler 12 and of the heat-generating aircraft device 16 are transmitted to the control unit 34, which parameters allow conclusions to be drawn about the waste heat amount generated by the cooler 12 and the heat-generating aircraft device 16 in the corresponding capacity utilization state. In addition to this, the temperature of the heat transfer medium flowing through the heat transfer circuit 26 of the heat transfer arrangement 18 upstream of the heat exchanger 22 is measured by means of a temperature sensor 40 arranged upstream of the heat exchanger 22 in the heat transfer circuit 26. From these parameters, the control unit 34 determines the waste heat amount generated by the cooler 12 and the heat-generating aircraft device 16 as a function of the operating state.

If the temperature of the cabin exhaust air flowing through the cabin exhaust air line 24 is high, for example when the aircraft is on the ground on hot days, the control unit 34 ensures, by increasing the cabin exhaust air volume flow through the cabin exhaust air line 24 of the cabin air extraction system 20, that a proper removal of waste heat from the cooler 12 and the heat-generating aircraft device 16 is ensured and the temperature of the heat transfer medium flowing through the heat transfer circuit 26 of the heat transfer arrangement 18 downstream of the heat exchanger 22 of the heat transfer arrangement 18 corresponds to the predetermined desired temperature. Furthermore, the control unit 34 reacts to an increasing waste heat amount generated by the cooler 12 and the heat-generating aircraft device 16 by increasing the cabin exhaust air volume flow through the cabin exhaust air line 24 of the cabin air extraction system 20. Conversely, the control unit 34 reduces the cabin exhaust air volume flow through the cabin exhaust air line 24 of the cabin air extraction system 20 when the cabin exhaust air flowing through the cabin exhaust air line 24 has a low temperature. Likewise, the cabin exhaust air volume flow through the cabin exhaust air line 24 of the cabin air extraction system 20 is reduced under the control of the control unit 34 when the waste heat amount generated by the cooler 12 and the heat-generating aircraft device 16 falls, for example, in the case of low capacity utilization of the cooler 12 and/or the heat-generating aircraft device 16.

The cabin exhaust air volume flow through the cabin exhaust air line 24 of the cabin air extraction system 20 is controlled by the control unit 34 by appropriate control of a conveying device 42 for conveying cabin exhaust air through the cabin exhaust air line 24. The conveying device 42 is configured in the form of a fan arranged in the cabin exhaust air line 24, in the embodiment of an aircraft cooling system 10 illustrated in the FIGURE.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft cooling system comprising:
   a cooler configured to supply cooling energy to an aircraft device to be cooled,
   a cabin air extraction system comprising a cabin exhaust air line and an extractor, and
   a heat transfer arrangement configured to transfer waste heat generated by the cooler to the cabin air extraction system, the heat transfer arrangement comprising a heat transfer circuit, in which a liquid heat transfer medium circulates through a first heat exchanger, a second heat exchanger, and a third heat exchanger, wherein the first heat exchanger is assigned to the cooler and transfers waste heat of the cooler to the liquid heat transfer medium, and the second heat exchanger is assigned to a heat-generating aircraft device, and transfers waste heat of the heat-generating aircraft device to the liquid heat transfer medium, and
   an electronic controller which is configured to control a cabin exhaust air volume flow through the cabin exhaust air line of the cabin air extraction system, as a function of the temperature of the cabin exhaust air flowing through the cabin exhaust air line and as a function of the operating state of at least one of the cooler and the heat-generating aircraft device, in such a manner that a desired waste heat removal from at least one of the cooler and the heat-generating aircraft device is ensured,
   wherein cabin exhaust air flows from the extractor through the third heat exchanger such that the cabin exhaust air is brought into thermal contact with the liquid heat transfer medium in the third heat exchanger, and
   wherein the cabin exhaust air flows through the cabin exhaust air line to ambient surroundings of the aircraft.

2. The aircraft cooling system according to claim 1, wherein the third heat exchanger of the heat transfer arrangement is arranged downstream of the extractor in the cabin exhaust air line of the cabin air extraction system.

3. The aircraft cooling system according to claim 1, wherein the electronic controller is configured to control the cabin exhaust air volume flow through the cabin exhaust air line of the cabin air extraction system, as a function of the temperature of the cabin exhaust air flowing through the cabin exhaust air line and as a function of the operating state of at least one of the cooler and the heat-generating aircraft device, in such a manner that the temperature of the heat transfer medium flowing through the heat transfer circuit at a point downstream of the third heat exchanger corresponds to a predetermined desired temperature.

4. The aircraft cooling system according to claim 3, wherein the electronic controller is configured to control the cabin exhaust air volume flow through the cabin exhaust air line of the cabin air extraction system by appropriate control of a conveying device for conveying the cabin exhaust air through the cabin exhaust air line.

5. A method for operating the aircraft cooling system of claim 1 comprising the steps:
   supplying cooling energy, to the aircraft device to be cooled, by means of the cooler, and
   transferring waste heat generated by the cooler to the cabin air extraction system by means of the heat transfer arrangement, the heat transfer arrangement comprising the heat transfer circuit, in which the liquid heat transfer medium heated by the waste heat of the cooler circulates.

6. The method according to claim 5, wherein the heat transfer arrangement further transfers waste heat generated by the heat-generating aircraft device to the cabin air extraction system.

7. The method according to claim 5, wherein the heat transfer medium heated by at least one of the waste heat of the cooler and the waste heat of the heat-generating aircraft device is brought into thermal contact with cabin exhaust air flowing through the cabin exhaust air line of the cabin air extraction system by means of the third heat exchanger of the heat transfer arrangement.

8. The method according to claim 5, wherein the cabin exhaust air volume flow through the cabin exhaust air line of the cabin air extraction system is controlled by means of the electronic controller, as a function of the temperature of the cabin exhaust air flowing through the cabin exhaust air line and as a function of the operating state of at least one of the cooler and the heat-generating aircraft device, in such a manner that a desired waste heat removal from at least one of the cooler and the heat-generating aircraft device is ensured.

9. The method according to claim 8, wherein the cabin exhaust air volume flow through the cabin exhaust air line of the cabin air extraction system is controlled by means of the electronic controller, as a function of the temperature of the cabin exhaust air flowing through the cabin exhaust air line and as a function of the operating stated of at least one of the cooler and the heat-generating aircraft device, in such a manner that the temperature of the heat transfer medium flowing through the heat transfer circuit of the heat transfer arrangement downstream of the third heat exchanger of the heat transfer arrangement corresponds to a predetermined desired temperature.

10. The method according to claim 9, wherein the electronic controller controls the cabin exhaust air volume flow through the cabin exhaust air line of the cabin air extraction system by appropriate control of a conveying device for conveying cabin exhaust air through the cabin exhaust air line.

* * * * *